United States Patent [19]

Takagi

[11] Patent Number: 5,373,340
[45] Date of Patent: Dec. 13, 1994

[54] CAMERA SYSTEM

[75] Inventor: Tadao Takagi, Yokohama, Japan

[73] Assignee: Nikon Corporation, Tokyo, Japan

[21] Appl. No.: 5,139

[22] Filed: Jan. 15, 1993

[30] Foreign Application Priority Data

Jan. 29, 1992 [JP] Japan .................. 4-013622

[51] Int. Cl.⁵ ............................. G03B 13/36
[52] U.S. Cl. .................. 354/400; 354/414; 354/432
[58] Field of Search ............. 354/400, 402, 403, 406, 354/407, 408, 413, 414, 415, 416, 417, 418, 432

[56] References Cited

U.S. PATENT DOCUMENTS

| | | | |
|---|---|---|---|
| 4,470,681 | 9/1984 | Johnson | 354/403 |
| 4,561,749 | 12/1985 | Utagawa | 354/406 |
| 4,829,331 | 5/1989 | Aihara | 354/400 |
| 4,941,009 | 7/1990 | Yoshida | 354/402 |
| 4,943,824 | 7/1990 | Nabeshima et al. | 354/400 |
| 4,959,678 | 9/1990 | Nakagawa | 354/403 |
| 4,977,423 | 12/1990 | Yamano et al. | 354/402 |
| 5,006,879 | 4/1991 | Takagi et al. | 354/413 |
| 5,040,014 | 8/1991 | Hata et al. | 354/402 |
| 5,051,766 | 9/1991 | Nonaku et al. | 354/402 |
| 5,111,231 | 5/1992 | Tokunaga | 354/402 |
| 5,111,232 | 5/1992 | Tsunefuji | 354/402 |
| 5,121,151 | 6/1992 | Kawabata et al. | 354/402 |
| 5,128,707 | 7/1992 | Muramutsu | 354/408 |
| 5,137,350 | 8/1992 | Misawa et al. | 354/403 |
| 5,148,211 | 9/1992 | Kotani et al. | 354/403 |
| 5,172,157 | 12/1992 | Takagi | 354/415 |
| 5,189,460 | 2/1993 | Hayakawa | 354/402 |
| 5,231,447 | 7/1993 | Takagi | 354/415 |

FOREIGN PATENT DOCUMENTS

3-58036  3/1991  Japan .
3-81624  4/1991  Japan .

*Primary Examiner*—Russell E. Adams
*Attorney, Agent, or Firm*—Shapiro and Shapiro

[57] ABSTRACT

A camera system comprises a flash device and a focus detecting device capable of effecting the focus detection of a plurality of areas and adapted to make focus adjustment preferentially to the nearest object in the plurality of areas when the flash device is in a state in which it is capable of emitting light.

15 Claims, 7 Drawing Sheets

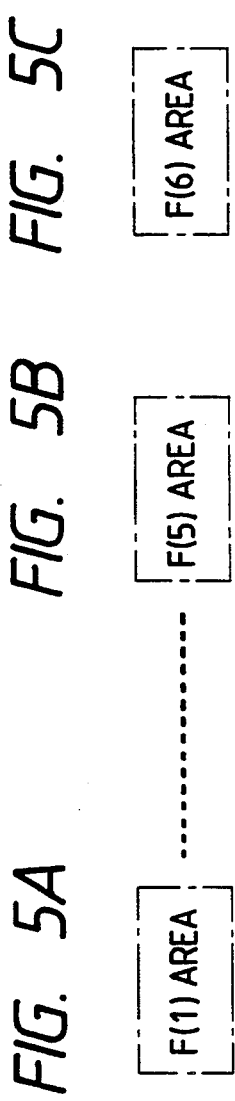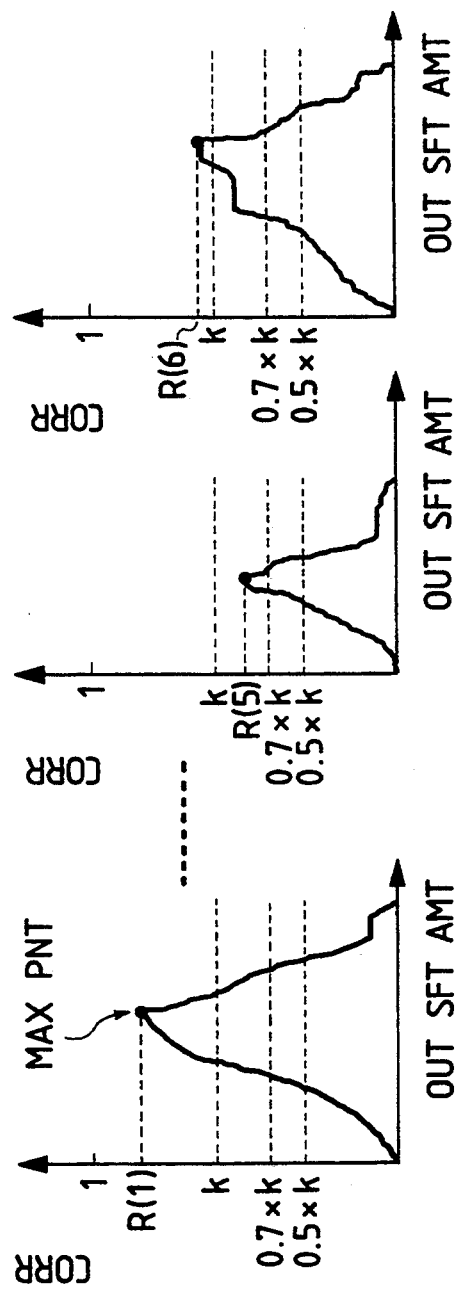
FIG. 5A  FIG. 5B  FIG. 5C

CAMERA SYSTEM

BACKGROUND OF THE INVENTION

1. Field of the Invention

This invention relates to a camera system having flash means and focus detecting means.

2. Related Background Art

As a camera system having flash means and focus detecting means, there has heretofore been one as disclosed, for example, in Japanese Laid-Open Patent Application No. 3-58036. This camera system has been such that a plurality of areas are distance-measured and the amount of emitted flashlight is determined on the basis of each bit of focus information.

Situations in which photographing is effected by the use of a flash device include slow synchro in which a person or persons are photographed in the nighttime with neon signs as the background, daylight synchro in which a person or persons are photographed against the light in the daytime, etc.

In case of the photographing of such scenes, the background is bright and strong in contrast as compared with a person or persons and therefore, a focus detecting apparatus capable of distance-measuring a plurality of areas, as it were, having a wide distance measuring area, has suffered from a serious problem of being liable to make focus adjustment to the background.

SUMMARY OF THE INVENTION

It is the object of the present invention to provide a focus detecting device in which even in a scene wherein during flash photographing, the background is bright and strong in contrast as compared with a person or persons, focus adjustment is made to the person or persons without being affected by the background.

In order to solve the above-noted problem, according to the present invention, a camera system is constructed so as to have flash means and focus detecting means which is capable of effecting the focus detection of a plurality of areas and makes focus adjustment preferentially to the nearest object in said plurality of areas when said flash means is in a state in which it is capable of emitting light.

Also, a camera system is constructed so as to have flash means and focus detecting means which is capable of effecting the focus detection of a plurality of areas and covers limited one of said plurality of areas as the object of focus adjustment when said flash means is in a state in which it is capable of emitting light.

BRIEF DESCRIPTION OF THE DRAWINGS

FIGS. 5A, 5B and 5C are graphs representing the correlation of output between the pair of element arrays of a focus detecting element 3.

DETAILED DESCRIPTION OF THE PREFERRED EMBODIMENTS

A first embodiment of the present invention will hereinafter be described with reference to FIGS. 1 to 6C, and a second embodiment of the present invention will hereinafter be described with reference to FIG. 7.

Figure 1:
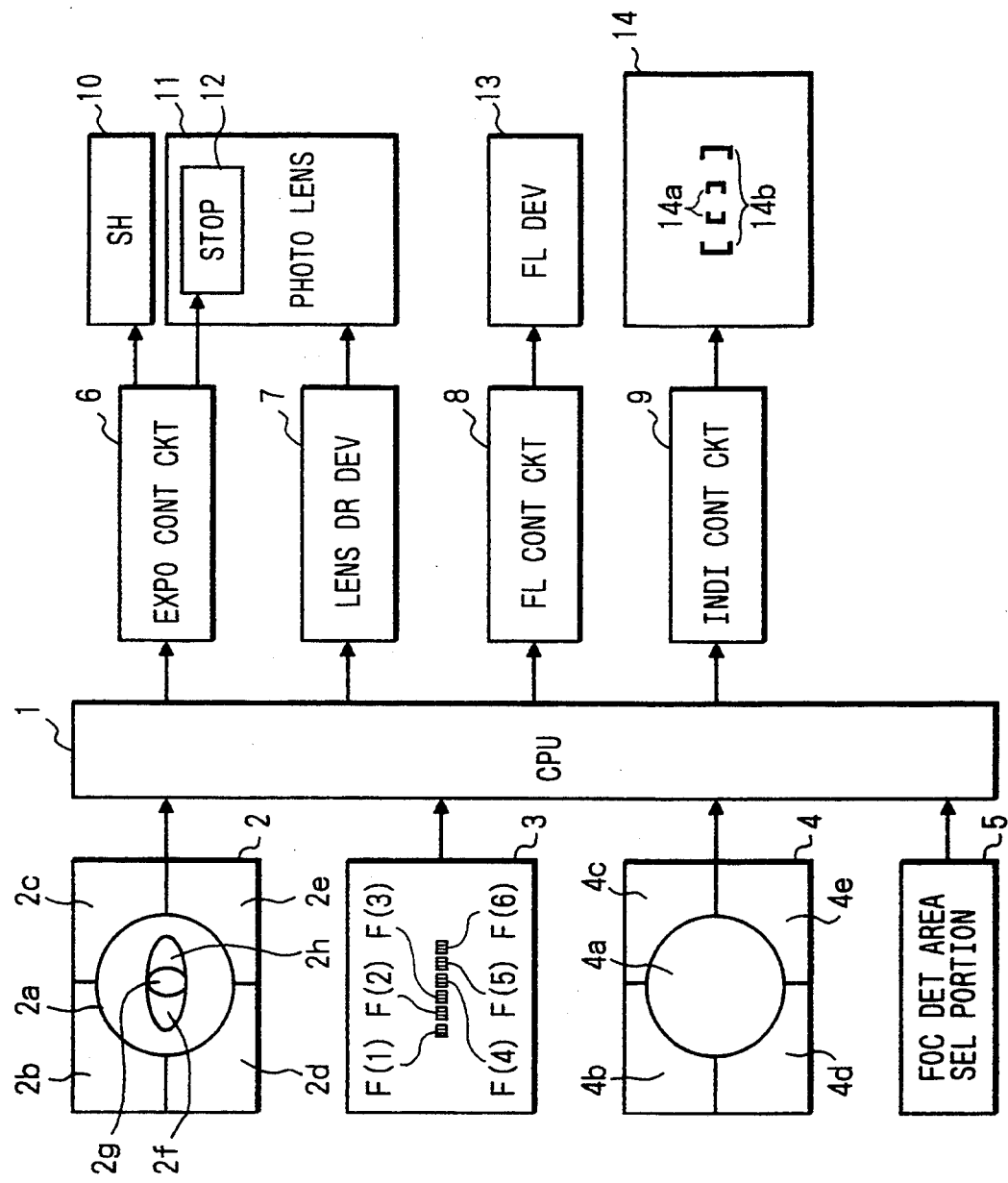
FIG. 1 is a block diagram of a camera system having a flash device and a focus detecting device according to an embodiment of the present invention.

FIG. 1 is a block diagram of a camera system having a flash device and a focus detecting device according to the present invention.

A CPU 1 receives information from a steady light metering element 2, a focus detecting element 3, a flash metering element 4, a focus detection area selecting portion 5, etc. as inputs. It processes these inputs and outputs the results of the processing to an exposure control circuit 6, a lens driving device 7, a flash control circuit 8, an indication control circuit 9, etc.

The steady light metering element 2 divides a light beam from the object field passed through a photo-taking lens 11 and a condensing lens, not shown, into eight areas (2a-2h) and meters them. Brightness metered in the area 2a is defined as B(1), brightness metered in the area 2b is defined as B(2), and brightnesses likewise metered in the other areas are defined as B(3)-B(8).

In the present embodiment, the design is such that object light beams passed through first and second areas of the photo-taking lens are re-imaged to thereby make two images and the mutual positional relation between these two images is found by the focus detecting element 3 to thereby obtain the amount and direction of shift of the imaging position from a predetermined focal plane (the imaging position is either on the object side or on the film side of the predetermined focal position).

The focus detecting element 3 is comprised of a CCD. The central portion of the image field and the vicinity thereof are divided into six areas (F(1)-F(6)) and focus detection is done.

The flash metering element 4 divides a light beam of the light emitted from a flash device 13 and reflected by the object field which has passed through the photo-taking lens 11 into five areas (4a-4e) and meters them.

The focus detection area selecting portion 5 is for the photographer to select the focus detection area in the image field, i.e., one of a spot area (14a) and a wide area (14b) as indicated by an indicating element 14.

The exposure control circuit 6 calculates an exposure value $BV_{ANS}$ by the CPU1 from the information metered by the steady light metering element 2, and controls a shutter 10 and a stop 12 in accordance with such exposure value $BV_{ANS}$.

The lens driving device 7 is a device which calculates a focus position by the CPU 1 from the information metered by the focus detecting element 3 and drives the photo-taking lens 11 to such focus position.

The flash control circuit 8 causes the flash device 13 to emit light in conformity with a command from the CPU 1, meters the emitted light beam thereof by the flash metering element 4, and causes the flash device 13 to stop its light emission again in conformity with a command from the CPU 1 at a point of time whereat the metered amount reaches a predetermined amount.

The indication control circuit 9 changes over the focus detection area selection of the indicating element 14 to the spot area 14a or the wide area 14b and indicates it in conformity with the result of the selection by the focus detection area selecting portion 5 and the possibility/impossibility of light emission of the flash device 13.

<Main Routine>

Figure 2:
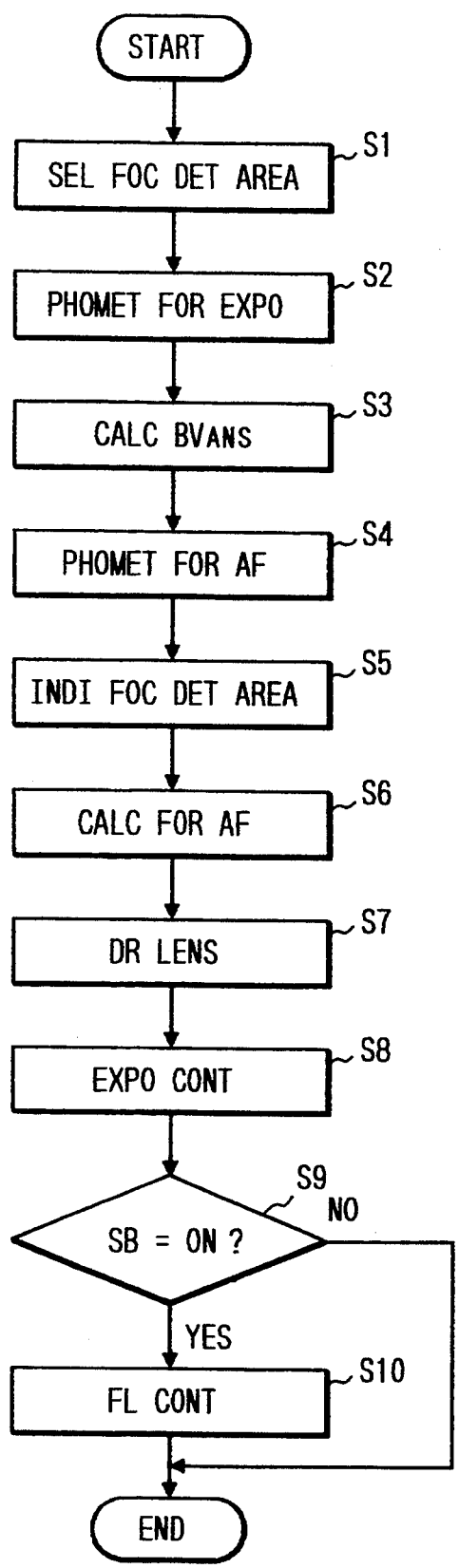
FIG. 2 is the main algorithm of the embodiment.

FIG. 2 shows the main algorithm of the CPU 1.

At a step S1, the result of the selection of the focus detection areas effected by the photographer by the use of the focus detection area selecting portion 5 is input.

At a step S2, the light metering of the eight areas is effected by the steady light metering element 2, and the brightness values of those eight areas are defined as BV(1)-BV(8).

At a step S3, the exposure value $BV_{ANS}$ is calculated by the use of the brightness values BV(1)-BV(8) of the eight areas metered at the step S2.

This calculation system is known as disclosed, for example, in applicant's Japanese Laid-Open Patent Application No. 3-81624 and therefore need not be described herein.

At a step S4, photometry for AF (auto focusing) by the focus detecting element 3 and its associated calculation are effected. The details of this step will be described later with reference to FIG. 3.

At a step S5, the indicating element 14 is driven through the indication control circuit 9. The indicating element 14 indicates whether the focus detection area input at the step S1 is the spot area 14a or the wide area 14b.

At a step S6, the focus position is determined in conformity with the result calculated at the step S4. The details of this step will be described later with reference to FIG. 4.

At a step S7, lens driving is effected by the use of the lens driving device 7 in conformity with the result determined at the step S6 to thereby effect focus adjustment.

At a step S8, exposure control is effected on the basis of the exposure value determined at the step S3.

At a step S9, whether the flash device 13 is in a state in which it is capable of emitting light is judged, and if it is in a state in which it is incapable of emitting light, exposure control is terminated and the routine is finished, and if it is in a state in which it is capable of emitting light, flash control is effected and exposure control is terminated and the routine is finished (step S10).

<AF Photometry Routine>

Figure 3:
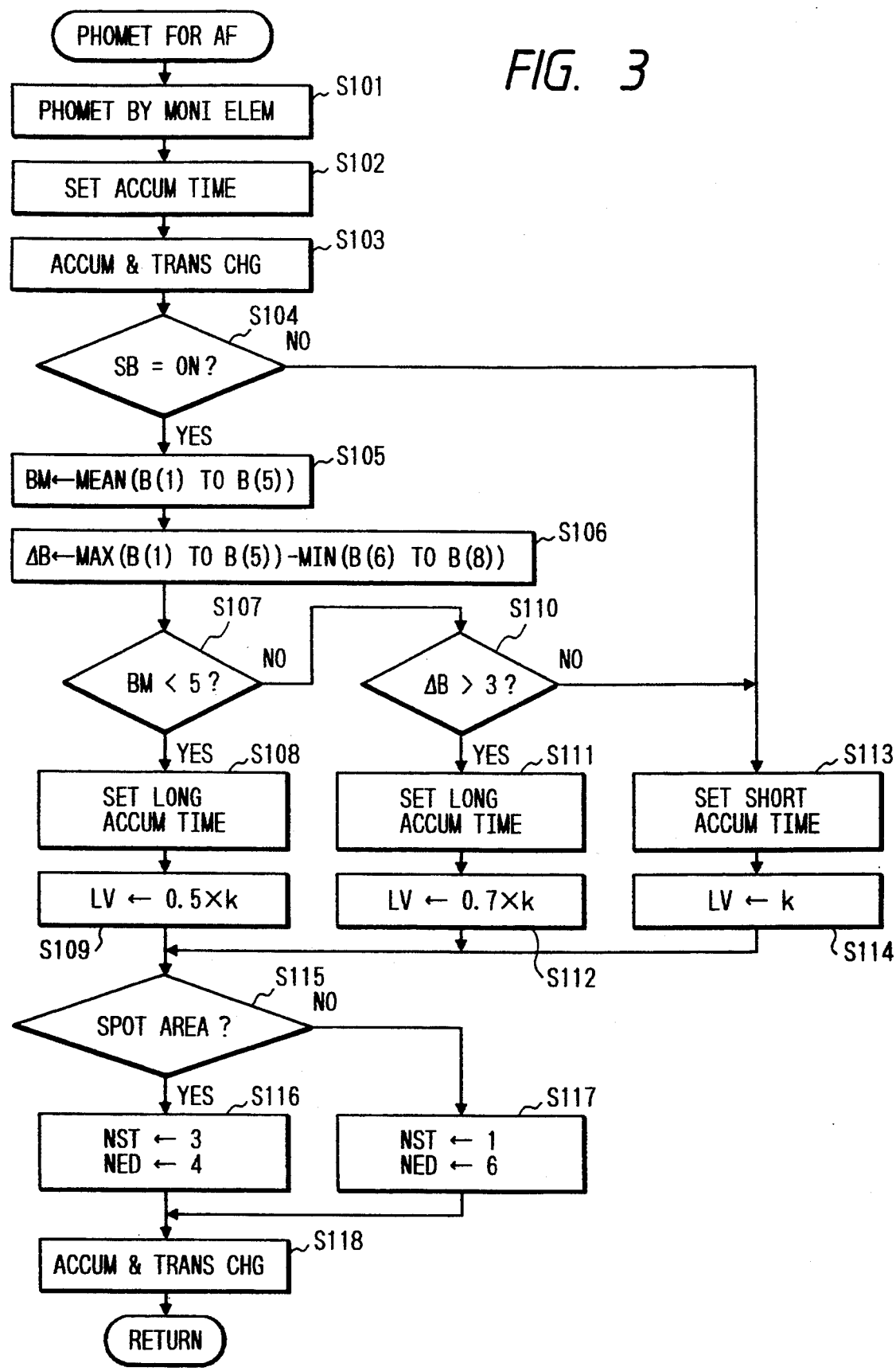
FIG. 3 shows a first embodiment of the main algorithm regarding photometry for AF.

FIG. 3 shows a first algorithm which illustrates in detail the photometry for AF effected at the step S4.

At a step S101, the brightness of the whole of the focus detection areas is metered by a monitor element, not shown, such as an auto gain control (AGC) disposed near the light receiving portion of the CCD which is the focus detecting element 3.

At a step S102, the accumulation time of the CCD is set on the basis of the brightness metered at the step S101.

At a step S103, the accumulation of charges in the CCD is effected on the basis of the accumulation time set at the step S102 and the charges are transferred.

At a step S104, whether the flash device 13 is in a state in which it is capable of emitting light is discriminated, and if it is in a state in which it is capable of emitting light, advance is made to a step S105, and if it is in a state in which it is incapable of emitting light, advance is made to a step S113.

At the step S105, the mean value BM of the brightness values BV(1)-BV(5) which are the marginal portions of the object field is calculated.

At a step S106, the brightness difference $\Delta B$ between the maximum values MAX(B(1)-B(5)) of the brightness values BV(1)-BV(5) of the marginal portions of the object field and the minimum values MIN(B(6)-B(8)) of the brightness values BV(6)-BV(8) of the central portion of the object field is calculated.

At a step S107, whether the mean value BM of the brightness values BV(1)-BV(5) of the marginal portions of the object field calculated at the step S105 is smaller than 5[BV] is discriminated. If the mean value BM is smaller than 5[BV], advance is made to a step S108, where it is judged that the object field is dark, and condition setting which premises flash photographing in a dark place is effected. If the mean value BM of the marginal portions of the object field is not smaller than 5[BV], advance is made to a step S110.

At the step S108, a long accumulation time intended for the low output of the CCD is set on the basis of the result accumulated by the CCD at the step S103. The reason for this will be described later with reference to FIGS. 6A-6C.

At a step S109, a discrimination level LV used for the discrimination of whether the maximum value of the result of correlation calculation for focus position detection effected at a later step is regarded as low contrast is set to $LV = 0.5 \times k$, where k is a constant exceeding 0 and equal to or smaller than 1. The reason why the discrimination level LV is thus set will be described later with reference to FIG. 5.

At a step S110, whether the brightness difference $\Delta B$ calculated at the step S106 is greater than 3[BV], that is, whether the brightness difference between the marginal portions of the object field and the central portion of the object field is great, is discriminated. If it is greater than 3[BV], advance is made to a step S111, where it is judged that the main object is against the light, and condition setting which premises daylight synchro photographing is effected. If the brightness difference $\Delta B$ is not greater than 3[BV], advance is made to a step S113.

At the step S111, a long accumulation time intended for the low output of the CCD is set on the result accumulated by the CCD at the step S103. The reason for this will be described later with reference to FIGS. 6A-6C.

At a step S112, as at the step S109, the discrimination level LV used for the discrimination of whether the maximum value of the result of correlation calculation is regarded as low contrast is set to $0.7 \times k$. k is similar to that at the step S109.

At the step S113, a short accumulation time intended for the high output of the CCD is set on the basis of the result accumulated by the CCD at the step S103. The reason for this will be described later with reference to FIGS. 6A-6C.

At a step S114, as at the step S109, the discrimination level LV used for the discrimination of whether the maximum value of the result of correlation calculation is regarded as low contrast is set to $LV = k$.

At a step S115, whether the focus detection area selected at the step S1 is the spot area is discriminated. If it is the spot area, advance is made to a step S116, and if it is the wide area, advance is made to a step S117.

At the step S116, NST and NED are defined as NST=3 and NED=4, respectively, in order to set F(3)-F(4) which are the spot areas as the object areas of focus detection.

At the step S117, NST and NED are defined as NST=1 and NED=6, respectively, in order to set F(1)-F(6) which are the wide areas as the object areas of focus detection.

At a step S118, the accumulation and transfer of charges in the CCD are effected in accordance with the accumulation time set at the step S108, the step S111 or the step S113, and return is made to the main routine.

<AF Photometry Routine>

Figure 4:
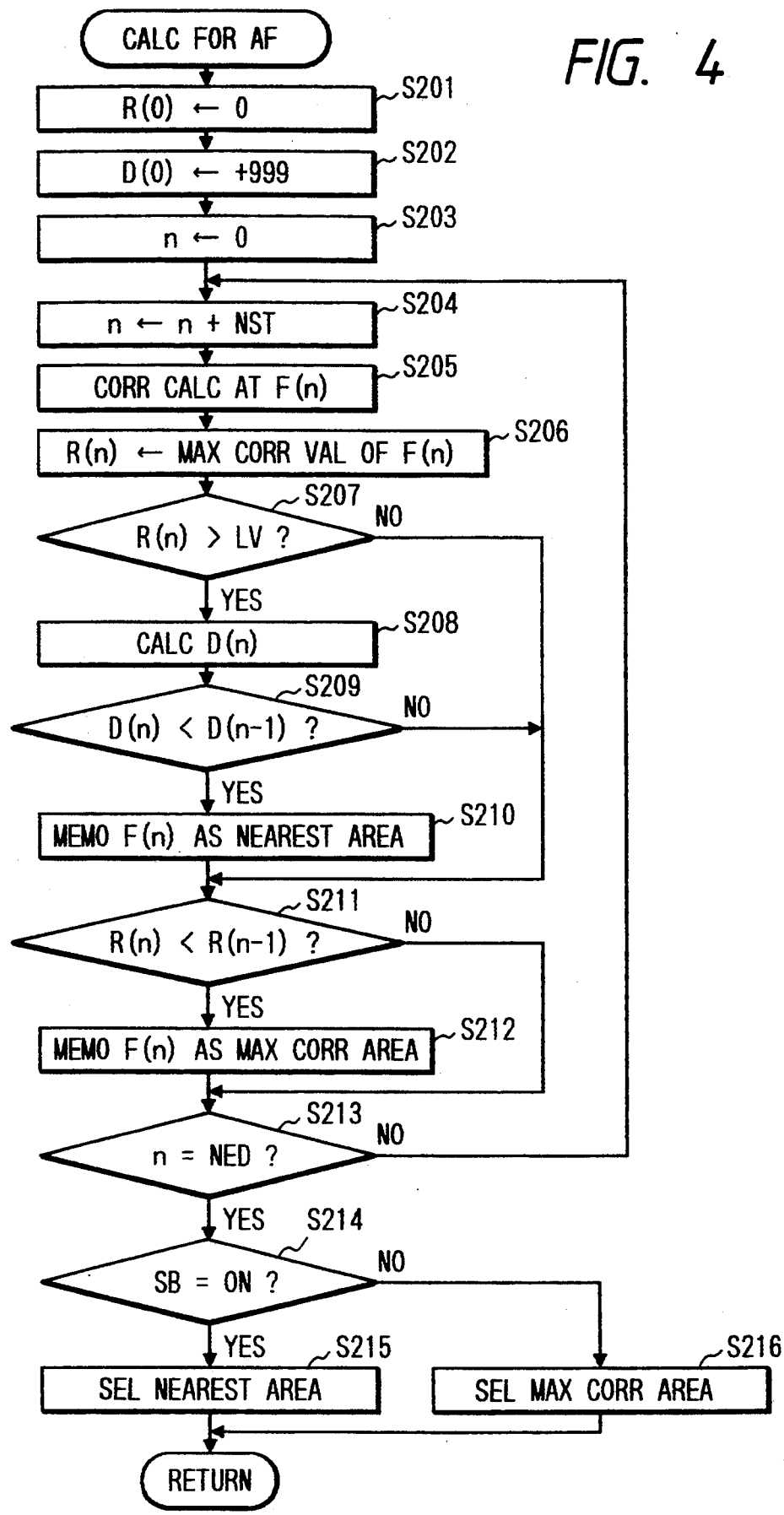
FIG. 4 is a detailed diagram of the main algorithm regarding calculation for AF.

FIG. 4 shows an algorithm which illustrates the AF calculation of the step S6 of FIG. 2 in detail.

At a step S201, 0 is substituted for R(0) to thereby set an initial value.

At a step S202, 999 is substituted for D(0) to thereby set an initial value.

At a step S203, 0 is substituted for n to thereby set an initial value.

At a step S204, n+NST is substituted for n.

At a step S205, the correlation calculation of the areas F(n) which are the object areas of focus detection is effected. The correlation calculation is to find a correlation function between a pair of element arrays in each area, and the value thereof is 1 at greatest when the correlation is strongest. Such correlation calculation is described in U.S. Pat. No. 4,561,749.

At a step S206, the maximum value of the correlation of the area F(n) (the maximum value of the correlation function) is defined as R(n).

At a step S207, whether the maximum value R(n) of the correlation is greater than the discrimination level LV of low contrast is discriminated. If it is greater than the discrimination level LV, advance is made to a step S208, and if it is not greater than the discrimination level LV, advance is made to S211.

At the step S208, a defocus amount D(n) corresponding to the shift amount of the output which gives the maximum value of the correlation is calculated.

At a step S209, the defocus amount D(n) of the area F(n) and the defocus amount D(n−1) of the area F(n−1) are compared with each other and if D(n) is smaller than D(n−1), advance is made to a step S210, and if D(n) is not smaller than D(n−1), advance is made to a step S211.

At the step S210, the area F(n) is memorized as the nearest area. This is repeated a number of times corresponding to the number of the areas which are the objects of focus detection between the step S204 and a step S213 and therefore, the nearest one of the areas which are the objects of focus detection is finally memorized.

At the step S211, the maximum value R(n) of the correlation of the area F(n) and the maximum value R(n−1) of the correlation of the area F(n−1) are compared with each other, and if R(n) is greater than R(n−1), advance is made to a step S212, and if R(n) is not greater than R(n−1), advance is made to a step S213.

At the step S212, the area F(n) is memorized as the maximum correlation area. This is repeated a number of times corresponding to the number of the areas which are the objects of focus detection between the step S204 and the step S213 and therefore, the maximum correlation area of the areas which are the objects of focus detection is finally memorized.

At the step S213, whether n has reached NED is discriminated, and if n has reached NED, advance is made to a step S214, and if n has not reached NED, return is made to the step S204.

At the step S214, whether the flash device 13 is in a state in which it is capable of emitting light is discriminated, and if it is in a state in which it is capable of emitting light, advance is made to a step S215, and if it is in a state in which it is incapable of emitting light, advance is made to a step S216. At the step S215, the nearest area determined at the step S210 is selected as the object area of focus adjustment. Then, return is made to the main routine.

At the step S216, the maximum correlation area determined at the step S212 is selected as the object area of focus adjustment. Then, return is made to the main routine.

FIG. 5A is a graph showing the correlation of the output between a pair of element arrays in the area F(1) of the focus detecting element 3. In FIG. 5A, the abscissa represents the shift amount of the output between a pair of element arrays. The ordinate represents the correlation, the value of which is 1 at greatest when the correlation is strongest. The shift amount of the output which gives the maximum value R(1) of the correlation corresponds to the shift amount of the focus.

In this case, the maximum value of the correlation is great and therefore, even if the discrimination level LV of low contrast is k, this area can be used as the object area of focus detection. FIGS. 5B and 5C are similar to FIG. 5A, FIG. 5B being a graph showing the correlation of the output between a pair of element arrays in the area F(5) of the focus detecting element 3, and FIG. 5C being a graph showing the correlation of the output between a pair of element arrays in the area F(6). The areas F(2)–F(4) are omitted.

The area F(5) is not very great in the maximum value of the correlation and therefore, if the discrimination level LV of low contrast is k, this area will be put out of the object area of focus detection. When the main object is dark or is against the light and the irradiation by the flash device is necessary, it is often the case that the correlation becomes low as shown in FIG. 5B even if the main object is in the area F(5). So, in case of the condition that the main object is dark or is against the light and the flash device is used, there arises the necessity of reducing the discrimination level LV of low contrast to $LV=0.7 \times k$ or $LV=0.5 \times k$ while knowing that accuracy will be reduced, as disclosed in FIG. 3.

Figure 6A:
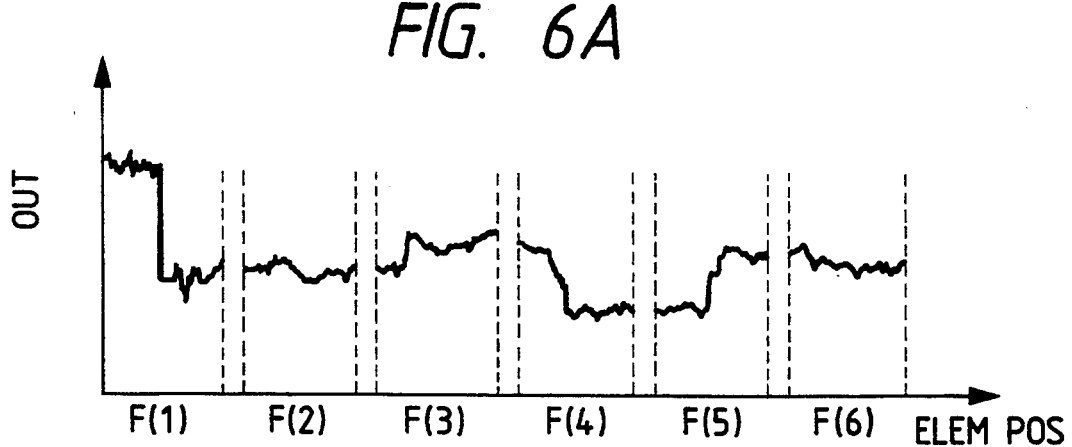
FIGS. 6A, 6B and 6C are graphs representing the outputs from CCDs in the respective areas of the focus detecting element 3.

FIG. 6A shows an example of the output put out from the CCD in each of the area F(1)-F(6) of the focus detecting element 3. In FIG. 6A, the ordinate represents the position of the element on one side of the pair of element arrays, and the ordinate represents the output from the CCD.

Figure 6B:
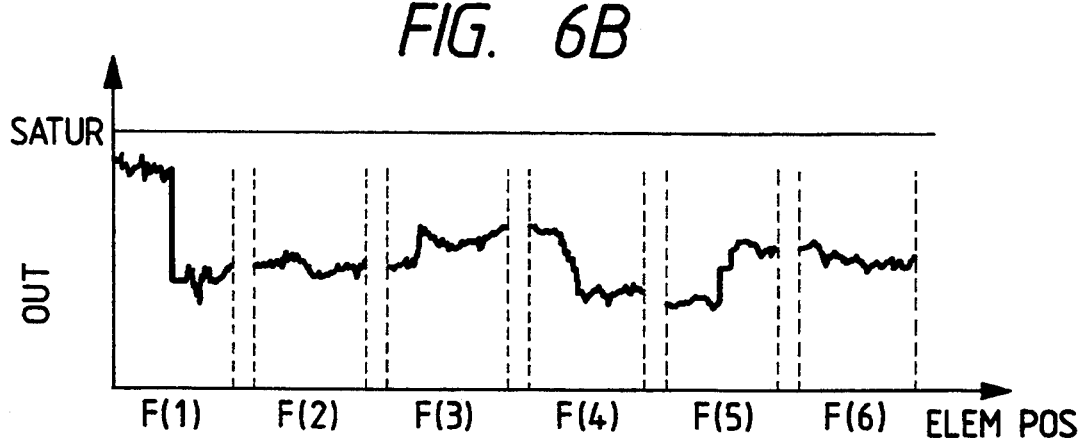

FIG. 6B shows a case where the accumulation time of the CCD is set to a short time and is adjusted to the high brightness side. Even if a main object exists over the areas F(4)–F(5), focus adjustment is done to the area F(1) because in the correlation calculation for focus detection, the correlation becomes great in a portion wherein contrast is strong. Accordingly, the main object becomes out of focus.

Figure 6C:
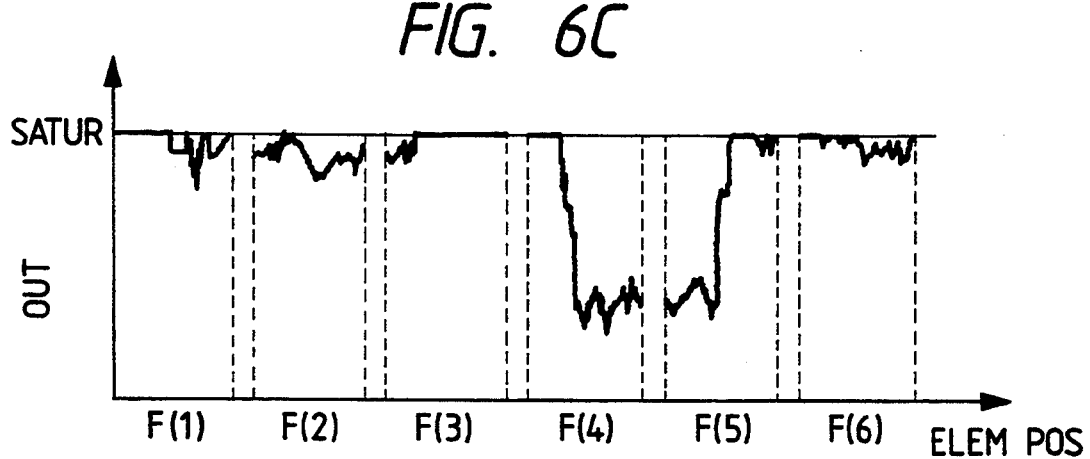

FIG. 6C shows a case where the accumulation time of the CCD is set to a long time and is adjusted to the low brightness side, and the output of the high brightness side is saturated and sacrificed. When a main object exists over the areas F(4)–F(5), focus adjustment is done to the area F(4) or the area F(5) because in the correlation calculation for focus detection, the correlation becomes great in a portion wherein contrast is strong. Accordingly, the lens is in focus on the main object.

Figure 7:
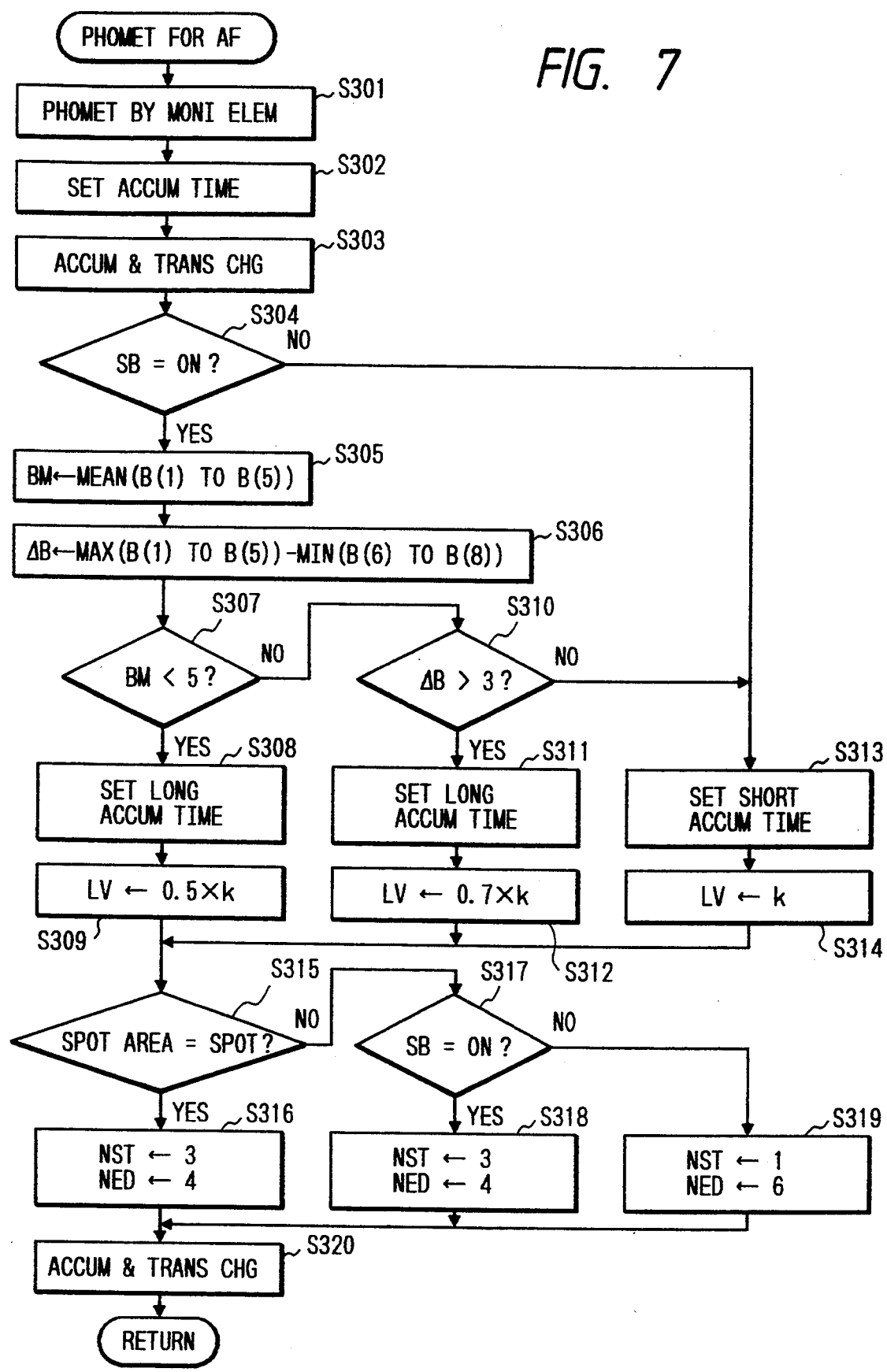
FIG. 7 shows a second embodiment of the main algorithm regarding photometry for AF.

FIG. 7 shows a second algorithm differing from the first algorithm which illustrates in detail the photometry for AF of the step S4 disclosed in FIG. 3.

At a step S301, the brightness of the whole of the focus detection area is metered by a monitor element, not shown, which is disposed near the light receiving portion of the CCD of the focus detecting element 3.

At a step S302, the setting of the accumulation time of the CCD is effected on the basis of the brightness metered at the step S301.

At a step S303, charges are accumulated in the CCD on the basis of the accumulation time set at the step S302 and are transferred.

At a step S304, whether the flash device 13 is in a state in which it is capable of emitting light is discriminated, and if it is in a state in which it is capable of emitting light, advance is made to a step S305, and if it is in a state in which it is incapable of emitting light, advance is made to a step S313.

At the step S305, the mean value BM of the brightness values BV(1)–BV(5) which are the marginal portions of the object field is calculated.

At a step S306, the brightness difference ΔB between the maximum values MAX(B(1)–B(5)) of the brightness values BV(1)–BV(5) which are the marginal portions of the object field and the minimum values MIN(B(6)–B(8)) of the brightness values BV(6)–BV(8) which are the central portion of the object field is calculated.

At a step S307, whether the mean value BM of the brightness values BV(1)–BV(5) which are the marginal portions of the object field calculated at the step S305 is smaller than 5[BV] is discriminated. If it is smaller than 5[BV], advance is made to a step S308, and it is judged that the object field is dark, and condition setting which premises flash photographing in a dark place is effected. If the mean value BM of the marginal portions of the object field is not smaller than 5[BV], advance is made to a step S310.

At the step S308, a long accumulation time intended for the low output of the CCD is set on the basis of the result accumulated by the CCD at the step S303. The reason for this is as described above with reference to FIGS. 6A to 6C.

At a step S309, a discrimination level LV used for the discrimination of whether the maximum value of the result of the correlation calculation for focus position detection effected at a later step is regarded as low contrast is set to LV=0.5×k, where k is a constant exceeding 0 and equal to or smaller than 1.

At the step S310, whether the brightness difference ΔB calculated at the step S306 is greater than 3[BV] is discriminated. If it is greater than 3[BV], advance is made to a step S311, and it is judged that the main object is against the light, and condition setting which premises daylight synchro photographing is effected. If the brightness difference ΔB is not greater than 3[BV], advance is made to a step S313.

At the step S311, a long accumulation time intended for the low output of the CCD is set on the basis of the result accumulated by the CCD at the step S303. The reason for this is as described above with reference to FIGS. 6A to 6C.

At a step S312, as at the step S309, the discrimination level LV used for the discrimination of whether the maximum value of the result of the correlation calculation is regarded as low contrast is set. The set value is set as LV=0.7×k.

At the step S313, a short accumulation time intended for the high output of the CCD is set on the basis of the result accumulated by the CCD at the step S303. The reason for this is as described above with reference to FIGS. 6A to 6C.

At a step S314, as at the step S309, the discrimination level LV used for the discrimination of whether the maximum value of the result of the correlation calculation is regarded as low contrast is set. The set value is set as LV=k.

At a step S315, whether the focus detection area selected at the step S1 is the spot area is discriminated. If it is the spot area, advance is made to a step S316, and if it is the wide area, advance is made to a step S317.

At the step S316, NST and NED are defined as NST=3 and NED=4, respectively, in order to set F(3)–F(4) which are the spot areas as the object areas of focus detection.

At the step S317, whether the flash device 13 is in a state in which it is capable of emitting light is discriminated, and if it is in a state in which it is capable of emitting light, advance is made to a step S318, and if it is in a state in which it is incapable of emitting light, advance is made to a step S319. This process is the point in which the second embodiment differs from the first embodiment. The time when the flash device 13 is set to a state in which it is capable of emitting light is the time when the main object is dark or is against the light and therefore, if the wide area remains to be the object area of focus detection, focus adjustment is liable to be effected to the background of the main object which is high in contrast.

So, at the step S318, even if the photographer's setting is the wide area, it is forcibly changed to the areas F(3)–F(4) which are the spot areas, and NST and NED are defined as NST=3 and NED=4, respectively. The indication of the focus detection areas is done to the spot 14a at the step S5.

At the step S319, NST and NED are defined as NST=1 and NED=6, respectively, in order to set F(1)–F(6) which are the wide areas as the object areas of focus detection.

At a step S320, the accumulation and transfer of the charges in the CCD are effected in accordance with the accumulation time set at the step S308, the step S311 or the step S313, and return is made to the main routine.

As described above, according to the present invention, in a camera system wherein the focus detection of a plurality of areas is possible, focus detecting means is designed such that when flash means is set to a state in which it is capable of emitting light, focus adjustment is preferentially made to the nearest object in said plurality of areas or a limited area becomes the object of focus adjustment and therefore, even in a scene wherein during flash photographing, the background is bright and strong in contrast as compared with a person or persons, focus adjustment is made to the person or persons without being affected by the background.

What is claimed is:

1. A camera system comprising:
    a flash device for irradiating an object;
    a focus detecting element for performing a focus detection at each of a plurality of areas into which a field including the object is divided;

a motor for moving a photographic lens to a focus position in accordance with a focus detection signal from said focus detecting element;

a judging circuit for judging whether said flash device is in a flashable state or not; and a control circuit for controlling said motor to drive said photographing lens so that the nearest object in one of the plurality of areas is focused, when said judging circuit judges that said flash device is in the flashable state.

2. A camera system according to claim 1, further comprising an output level varying circuit for varying an output level from said focus detecting element.

3. A camera system according to claim 1, further comprising a correlation calculation circuit for performing a correlation calculation of an output from said focus detection element at each of the areas, and a detecting circuit for detecting a contrast condition in accordance with a result of a comparison between the correlation value calculated in said correlation calculation circuit and a predetermined value, and a value varying circuit for varying the predetermined value of said detecting circuit.

4. A camera system comprising:

a flash device for irradiating an object;

a photometric element for metering a brightness of a field including an object;

a focus detecting element for performing a focus detection at each of a plurality of areas into which the field is divided;

a motor for moving a photographic lens to a focus position in accordance with a focus detection signal from said focus detecting element;

a first judging circuit for judging whether said flash device is in a flashable state or not;

a second judging circuit for judging whether the field is dark or not, on the basis of a photometric output from said photometric element; and a control circuit for controlling said motor to drive said photographing lens so that the nearest object in one of the plurality of areas is focused, when said first judging circuit judges that said flash device is in the flashable state and said second judging circuit judges that the field is dark.

5. A camera system according to claim 4, further comprising an output level varying circuit for varying an output level from said focus detecting element.

6. A camera system according to claim 4, further comprising a correlation calculation circuit for performing a correlation calculation of an output from said focus detection element at each of the areas, and a detecting circuit for detecting a contrast condition in accordance with a result of a comparison between the correlation value calculated in said correlation calculation circuit and a predetermined value, and a value varying circuit for varying the predetermined value of said detecting circuit.

7. A camera system comprising:

a flash device for irradiating an object;

a photometric element for metering a brightness of each of a plurality of areas into which a field including the object is divided;

a focus detecting element for performing a focus detection at each of the areas;

a motor for moving a photographic lens to a focus position in accordance with a focus detection signal from said focus detecting element;

a first judging circuit for judging whether said flash device is in a flashable state or not;

a second judging circuit for detecting a rear light condition on the basis of a photometric output from said photometric element; and a control circuit for controlling said motor to drive said photographing lens so that the nearest object in one of the plurality of areas is focused, when said first judging circuit judges that said flash device is in the flashable state and said second judging circuit detects the rear light condition.

8. A camera system according to claim 7, further comprising an output level varying circuit for varying an output level from said focus detecting element.

9. A camera system according to claim 7, further comprising a correlation calculation circuit for performing a correlation calculation of an output from said focus detection element at each of the areas, and a detecting circuit for detecting a contrast condition in accordance with a result of a comparison between the correlation value calculated in said correlation calculation circuit and a predetermined value, and a value varying circuit for varying the predetermined value of said detecting circuit.

10. A camera system comprising:

a flash device for irradiating an object;

a photometric element for metering a brightness of a specified area in a field including an object;

a focus detecting element for performing a focus detection at a plurality of areas into which the field is divided;

a judging circuit for judging whether said flash device is in a flashable state or not; and a selection circuit for selecting a focus detection area corresponding to the specified area within the plurality of areas, when said judging circuit judges that said flash device is in the flashable state.

11. A camera system according to claim 10, wherein the specified area is in the neighborhood of a center of the field.

12. A camera system comprising:

a flash device for irradiating an object;

a photometric element for metering a brightness of a specified area in a field including an object;

a focus detecting element for performing a focus detection at a plurality of areas into which the field is divided;

a first judging circuit for judging whether said flash device is in a flashable state or not;

a second judging circuit for judging whether the field is dark or not, on the basis of a photometric output from said photometric element; and a selection circuit for selecting a focus detection area corresponding to the specified area within the plurality of areas, when said first judging circuit judges that said flash device is in the flashable state and said second judging circuit judges that the field is dark.

13. A camera system according to claim 12, wherein the specified area is in the neighborhood of a center of the field.

14. A camera system comprising:

a flash device for irradiating an object;

a photometric element for metering a brightness of each of a plurality of areas into which a field including the object is divided;

a focus detecting element for performing a focus detection at each of the areas;

a motor for moving a photographic lens to a focus position in accordance with a focus detection signal from said focus detecting element;

a first judging circuit for judging whether said flash device is in a flashable state or not;

a second judging circuit for detecting a rear light condition on the basis of a photometric output from said photometric element; and a control circuit for controlling said motor to drive said photographing lens so that an object in a specified one of the plurality of areas is focused, when said first judging circuit judges that said flash device is in the flashable state and said second judging circuit detects the rear light condition.

15. A camera system according to claim 14, wherein the specified area is in the neighborhood of a center of the field.

* * * * *